(12) United States Patent
Thompson et al.

(10) Patent No.: US 9,878,820 B2
(45) Date of Patent: Jan. 30, 2018

(54) PATTERN OF RETRACTABLE STOPS FOR CONTAINMENT OF ARTICLES

(71) Applicant: ORBIS Corporation, Oconomowoc, WI (US)

(72) Inventors: Benjamin J. Thompson, Johnson Creek, WI (US); Scott J. Buss, Watertown, WI (US); Mike Andrew Ludka, Waukesha, WI (US)

(73) Assignee: ORBIS Corporation, Oconomowoc, WI (US)

(*) Notice: Subject to any disclaimer, the term of this patent is extended or adjusted under 35 U.S.C. 154(b) by 0 days.

(21) Appl. No.: 15/341,695

(22) Filed: Nov. 2, 2016

(65) Prior Publication Data

US 2017/0137172 A1    May 18, 2017

Related U.S. Application Data

(60) Provisional application No. 62/254,955, filed on Nov. 13, 2015.

(51) Int. Cl.
*B65D 19/44* (2006.01)
*B62B 3/00* (2006.01)

(52) U.S. Cl.
CPC ............ *B65D 19/44* (2013.01); *B62B 3/00* (2013.01); *B65D 2519/00338* (2013.01)

(58) Field of Classification Search
CPC .................................................. B65D 19/44
See application file for complete search history.

(56) References Cited

U.S. PATENT DOCUMENTS

2002/0195027 A1* 12/2002 Mallan .................. C04B 22/148
106/823

FOREIGN PATENT DOCUMENTS

| GB | 2328419 A | 2/1999 |
| GB | 2430926 A | 4/2007 |

OTHER PUBLICATIONS

Russian Patent Office, International Search Report and Written Opinion of International Searching Authority for PCT/US2016/060290, dated Feb. 9, 2017 (6 pages).

* cited by examiner

*Primary Examiner* — John Walters
*Assistant Examiner* — James Triggs
(74) *Attorney, Agent, or Firm* — Greensfelder, Hemker & Gale, P.C.

(57) ABSTRACT

A transport structure, such as a pallet or dolly, having a plurality of retractable stops in a pattern to enable transport of a two-down configuration or a three-down configuration is provided.

20 Claims, 4 Drawing Sheets

PATTERN OF RETRACTABLE STOPS FOR CONTAINMENT OF ARTICLES

CROSS-REFERENCE TO RELATED APPLICATIONS

The present application claims the benefit of U.S. Provisional Patent Application No. 62/254,955, filed Nov. 13, 2015, the contents of which are incorporated herein by reference.

FEDERALLY SPONSORED RESEARCH OR DEVELOPMENT

N/A

FIELD OF THE INVENTION

The present invention generally relates to a transport item having a plurality of retractable stops spaced for containment of various sized articles such as containers.

BACKGROUND OF THE INVENTION

Pallets, dollies and other similar structures are used for transporting goods or other articles, typically held in containers. Issues arise if the containers move on the pallet during transportation. Currently, movement of containers during transportation is prevented or limited by hard stops, such as molded (i.e., fixed) perimeter lips and side walls; and/or frictional elements, such as rubber grommets and scuffed or gritty (i.e., rough) surfaces.

In certain instances, retractable stops (typically referred to as "pop-ups") positioned about the pallet or dolly can be used to create hard stops for containing certain size containers. For larger containers, the pop-up is retracted under the weight of the container.

The present invention provides a transport item with an improved pattern of retractable stops for containing articles of various sizes.

SUMMARY OF THE INVENTION

The present invention provides a pattern or configuration of retractable stops that holds containers of varying sizes and can also hold multiple quantities of containers. The present invention solves the issue of containing both large and small containers on a transport mechanism or structure (such as a pallet or dolly) while maximizing utilization of the transport mechanism.

In accordance with one aspect of the invention, a transport structure with stops for both a two-down and a three-down configuration is provided. The transport structure comprises a generally rectangular support surface having a first side, an opposing second side, a first end and an opposing second end. A first plurality of retractable stops is positioned in a spaced relationship proximate the first side of the support surface, where each of the first plurality of retractable stops are aligned with each other. A second plurality of retractable stops is positioned in a spaced relationship proximate the second side of the support surface, where each of the second plurality of retractable stops are aligned with each other. A third plurality of retractable stops is positioned in a spaced relationship proximate the first end of the support surface, where each of the third plurality of retractable stops are aligned with each other. A fourth plurality of retractable stops is positioned in a spaced relationship proximate the second end of the support surface, where each of the fourth plurality of retractable stops are aligned with each other. The support surface is free of retractable stops in an area between the first plurality of retractable stops, the second plurality of retractable stops, the third plurality of retractable stops and the fourth plurality of retractable stops. Additionally, the first plurality of retractable stops, the second plurality of retractable stops, the third plurality of retractable stops and the fourth plurality of retractable stops are positioned to enable transport of one of a two-down container pattern and a three-down container pattern.

The transport structure can be a pallet having the defined pattern of retractable stops. Alternatively, the transport structure can be a dolly or other similar structure.

The retractable stops can be formed from plastic. Similarly, the transport structure can also be formed from plastic. Both the retractable stops and/or other portions of the upper surface of the transport structure can be provided with friction elements (e.g., rubber).

In accordance with another aspect of the invention, a transport structure with outer and center stops that can accommodate both a two-down and a three-down configuration is provided. The transport structure comprises a generally rectangular support surface having a first side, an opposing second side, a first end and an opposing second end. A first plurality of retractable stops is positioned in a spaced relationship proximate the first side of the support surface, where each of the first plurality of retractable stops are aligned with each other. A second plurality of retractable stops is positioned in a spaced relationship proximate the second side of the support surface, where each of the second plurality of retractable stops are aligned with each other. A third plurality of retractable stops is positioned in a spaced relationship proximate the first end of the support surface, where each of the third plurality of retractable stops are aligned with each other. A fourth plurality of retractable stops is positioned in a spaced relationship proximate the second end of the support surface, where each of the fourth plurality of retractable stops are aligned with each other. A fifth plurality of retractable stops are positioned in a spaced relationship midway between the first plurality of retractable stops and the second plurality of retractable stops, where each of the fifth plurality of retractable stops are aligned with each other. The first plurality of retractable stops, the second plurality of retractable stops, the third plurality of retractable stops, the fourth plurality of retractable stops and the fifth plurality of retractable stops are positioned to enable transport of one of a two-down container pattern and a three-down container pattern.

Further aspects of the invention are disclosed in the Figures, and are described herein.

BRIEF DESCRIPTION OF THE DRAWINGS

To understand the present invention, it will now be described by way of example, with reference to the accompanying drawings in which.

DETAILED DESCRIPTION

Figure 1:
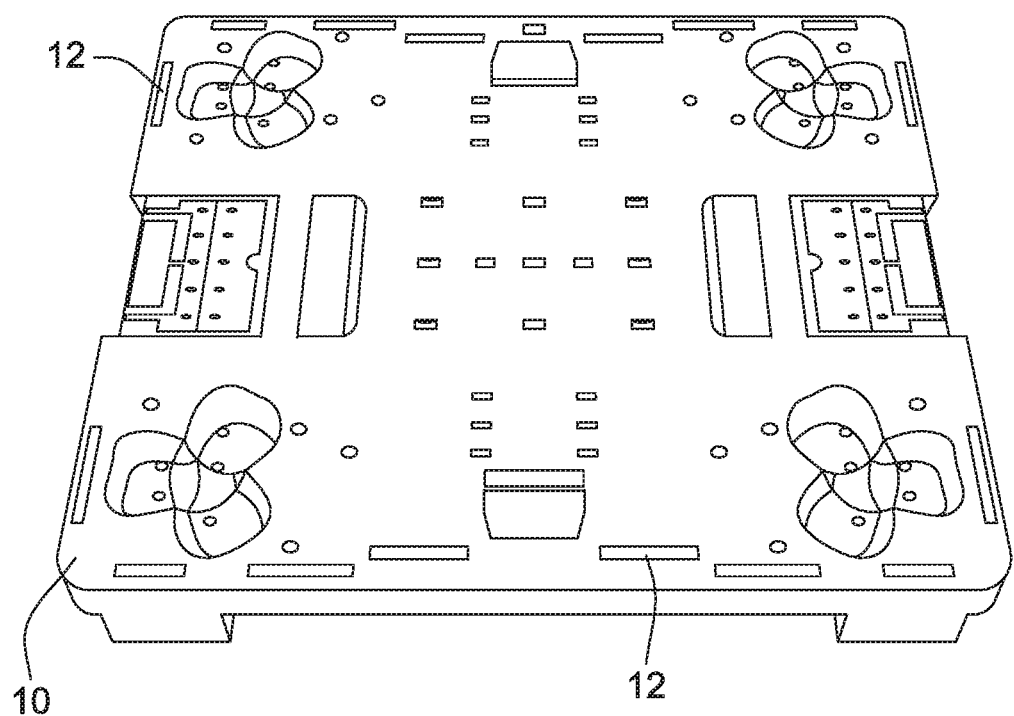
FIG. 1 is a perspective view of a prior dolly having a plurality of retractable stops in a known configuration.

While this invention is susceptible of embodiments in many different forms, there is shown in the drawings, and will herein be described in detail preferred embodiments of the invention with the understanding that the present disclosure is to be considered as an exemplification of the principles of the invention and is not intended to limit the broad aspect of the invention to the embodiments illustrated.

The present invention is directed to transport mechanisms, such as pallets, dollies and other similar structures. The pallets, dollies, etc. are typically formed from a molded plastic or other suitable material. The transport mechanisms include retractable stops in a pattern designed to contain various sized articles, such as containers.

Figure 2:
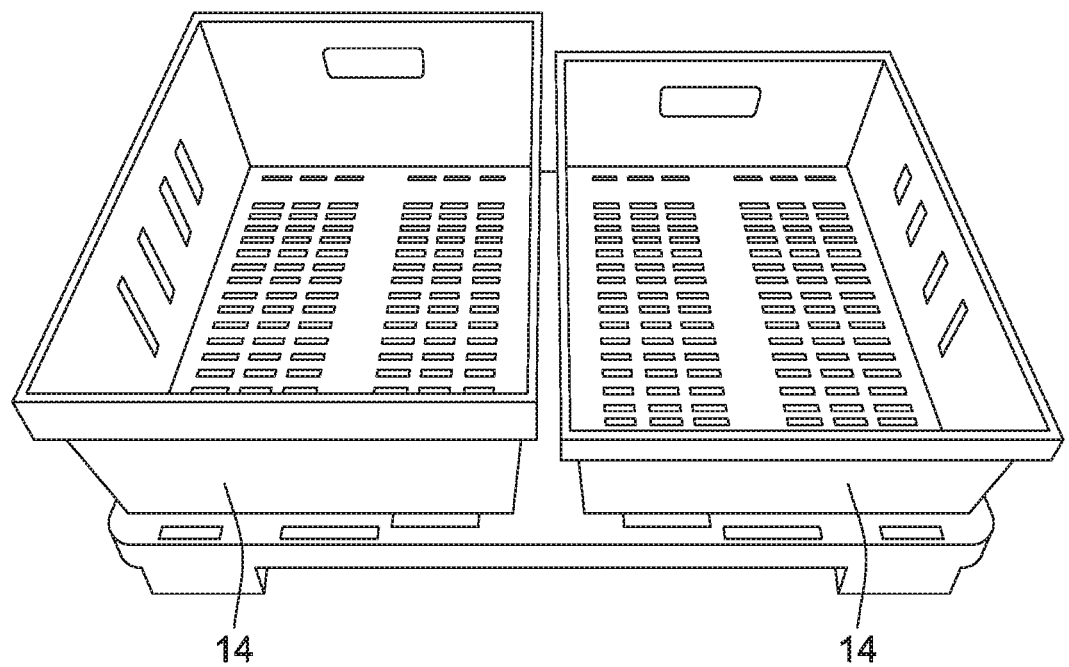
FIG. 2 is a perspective view of the dolly of FIG. 1 with a first and second container positioned on the dolly.

FIG. 1 shows one known dolly 10 (by Schoeller Allibert) having a plurality of stops 12 on an upper surface of the dolly. The stops are positioned to accommodate containers 14 in a two-down configuration as shown in FIG. 2.

The present invention provides a pattern of stops that is tailored for more than just the two-down configuration. Specifically, the pattern of the present invention is particularly designed to enable transport of either a two-down configuration or a three-down configuration.

Figure 3:
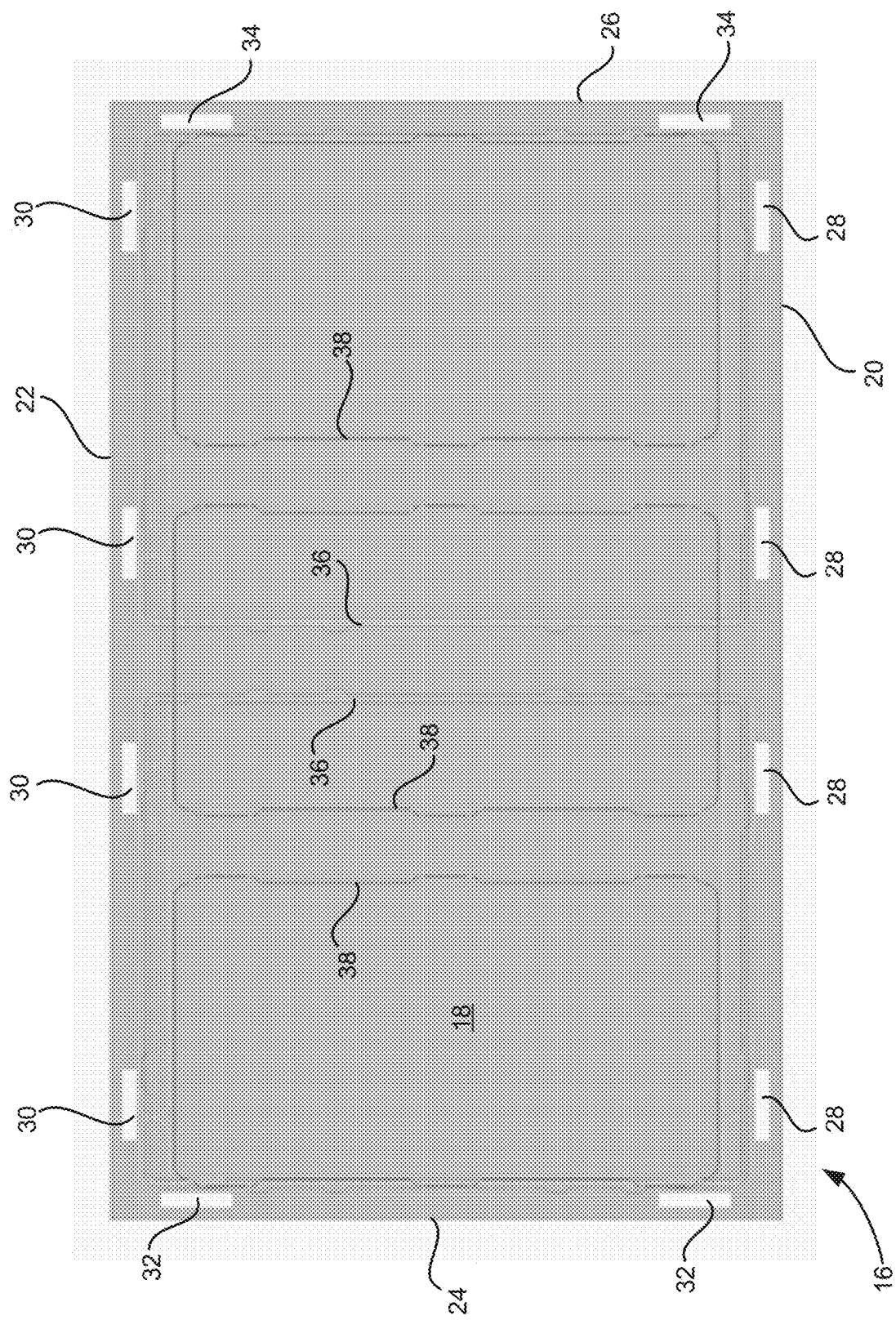
FIG. 3 is a top plan view of a pallet with retractable stops in accordance with the present invention schematically showing foot prints of both a two-down configuration of containers on the pallet and a three-down configuration of containers on the pallet; and, FIG. 4 is a perspective view of another aspect of a dolly with retractable stops in a pattern for containing articles of various sizes in accordance with the present invention.

FIG. 3 provides a top plan view of a pallet (or dolly or other similar transport structure) 16 having a generally rectangular upper surface 18. The upper surface 18 includes a first side 20, a second side 22 opposing the first side 20, a first end 24 and a second end 26 opposing the first end 24.

The pallet 16 includes a first plurality of stops 28 (such as "pop-ups," i.e., retractable stops) aligned in a row proximate the first side 20 of the upper surface 18, and a second plurality of stops 30 aligned in a row proximate the second side 22 of the upper surface 18. Each of the first plurality of stops 28 is positioned directly across from one of the second plurality of stops 30 and is parallel thereto.

The pallet also includes a third plurality of stops 32 aligned in a row proximate the first end 24 of the upper surface 18, and a fourth plurality of stops 34 aligned in a row proximate the second end 26 of the upper surface 18. Each of the third plurality of stops 32 is positioned directly across from the one of the fourth plurality of stops 34 and is parallel thereto. The third and fourth plurality of stops 32, 34 are perpendicular to the first and second plurality of stops 28, 30.

FIG. 3 includes a first footprint (i.e., an outline of the containers) 36 of a two-down configuration that is utilized with the stops. Additionally, FIG. 3 includes a second footprint 38 of a three-down configuration that can alternatively be used with the stops.

Figure 4:
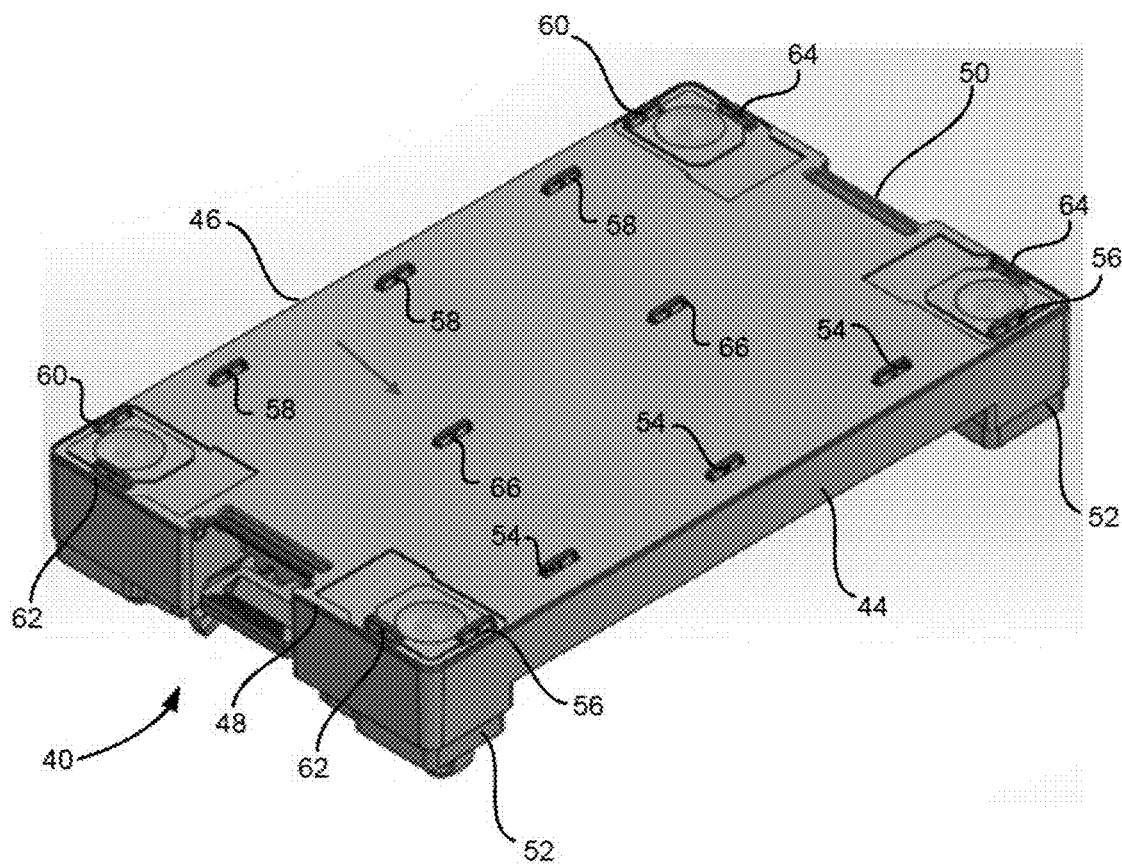

FIG. 4 shows a perspective view of a dolly 40 having a pattern of stops in accordance with another aspect of the present invention. Again, the pattern of stops can be utilized with a dolly or other similar transport structures.

The dolly 40 includes an upper surface 42 having a first side 44, a second side 46, a first end 48 and a second end 50. The dolly 40 also includes a plurality of wheel guards 52.

The dolly 40 includes a first plurality of stops 54 aligned proximate the first side 44. Corner stops 56 are positioned on either end of the first plurality of stops 54, slightly closer to the side 44.

The dolly 40 includes a second plurality of stops 58 aligned proximate the second side 46. Corner stops 60 are positioned on either end of the second plurality of stops 58, slightly closer to the side 46.

The dolly 40 includes a third plurality of stops 62 aligned along the first end 48, and a fourth plurality of stops 64 aligned proximate the second end 50. The third plurality of stops 62 and fourth plurality of stops 64 are perpendicular to the first plurality of stops 54 and second plurality of stops 58, as well as to the corner stops 56 and 60.

The dolly 40 also includes a fifth plurality of stops 66 aligned in the center of the pallet.

While each example shows a particular number of stops—more or less can be used as needed (e.g., depending on the size of the transport structure).

The transport structures 16, 40 can be formed from a molded plastic, or other suitable materials.

The retractable stops are mounted on the dolly 10 for linear movement up and down. The stops are biased to extend a portion of the stop upward above the upper support surface 18 in the absence of any weighted item (such as a container) being placed on top of the stops.

Many modifications and variations of the present invention are possible in light of the above teachings. It is, therefore, to be understood within the scope of the appended claims the invention may be protected otherwise than as specifically described.

We claim:

1. A transport structure comprising:
   a generally rectangular upper support surface having a first side, an opposing second side, a first end and an opposing second end;
   a first plurality of stops positioned in a spaced relationship proximate the first side of the support surface, each of the first plurality of stops aligned with each other;
   a second plurality of stops positioned in a spaced relationship proximate the second side of the support surface, each of the second plurality of stops aligned with each other;
   a third plurality of stops positioned in a spaced relationship proximate the first end of the support surface, each of the third plurality of stops aligned with each other;
   a fourth plurality of stops positioned in a spaced relationship proximate the second end of the support surface, each of the fourth plurality of stops aligned with each other;
   wherein the support surface is free of stops in an area between the first plurality of stops, the second plurality of stops, the third plurality of stops and the fourth plurality of stops; and,
   wherein the first plurality of stops, the second plurality of stops, the third plurality of stops and the fourth plurality of stops are positioned to enable transport of one of a two-down container pattern and a three-down container pattern.

2. The transport structure of claim 1 wherein the transport structure is a pallet.

3. The transport structure of claim 1 wherein the transport structure is a dolly.

4. The transport structure of claim 1 wherein each of the stops is formed from plastic.

5. The transport structure of claim 1 wherein the transport structure is formed from plastic.

6. The transport structure of claim 1 wherein each of the first plurality of stops is positioned directly across one of the second plurality of stops.

7. The transport structure of claim 1 wherein each of the third plurality of stops is positioned directly across one of the fourth plurality of stops.

8. The transport structure of claim 1 wherein each of the stops is retractable into the transport structure.

9. The transport structure of claim 8 wherein each of the stops is biased to extend above the upper support surface.

10. A transport structure comprising:
a generally rectangular upper support surface having a first side, an opposing second side, a first end and an opposing second end;
a first plurality of stops positioned in a spaced relationship proximate the first side of the support surface, each of the first plurality of stops aligned with each other;
a second plurality of stops positioned in a spaced relationship proximate the second side of the support surface, each of the second plurality of stops aligned with each other;
a third plurality of stops positioned in a spaced relationship proximate the first end of the support surface, each of the third plurality of stops aligned with each other;
a fourth plurality of stops positioned in a spaced relationship proximate the second end of the support surface, each of the fourth plurality of stops aligned with each other;
a fifth plurality of stops positioned in a spaced relationship midway between the first plurality of stops and the second plurality of stops, each of the fifth plurality of stops aligned with each other; and,
wherein the first plurality of stops, the second plurality of stops, the third plurality of stops, the fourth plurality of stops and the fifth plurality of stops are positioned to enable transport of one of a two-down container pattern and a three-down container pattern.

11. The transport structure of claim 10 wherein the transport structure is a pallet.

12. The transport structure of claim 10 wherein the transport structure is a dolly.

13. The transport structure of claim 10 wherein each of the retractable stops is formed from plastic.

14. The transport structure of claim 10 wherein the transport structure is formed from plastic.

15. The transport structure of claim 10 wherein each of the first plurality of stops is positioned directly across one of the second plurality of stops.

16. The transport structure of claim 10 wherein each of the third plurality of stops is positioned directly across one of the fourth plurality of stops.

17. The transport structure of claim 10 wherein each of the stops is retractable into the transport structure.

18. The transport structure of claim 17 wherein each of the stops is biased to extend above the upper support surface.

19. The transport structure of claim 10 further comprising a first corner stop spaced from a first end of the first plurality of stops, the first corner stop positioned closer to an edge of the first side than the first plurality of stops.

20. The transport structure of claim 10 further comprising a second corner stop spaced from a first end of the second plurality of stops, the second corner stop positioned closer to an edge of the second side than the first plurality of stops.

* * * * *